United States Patent [19]
Leary

[11] 3,775,228
[45] Nov. 27, 1973

[54] COMPOSITE LINEAR ELEMENTS
[75] Inventor: David E. Leary, Cumberland, R.I.
[73] Assignee: Owens-Corning Fiberglas Corporation, Toledo, Ohio
[22] Filed: June 8, 1971
[21] Appl. No.: 151,018

[52] U.S. Cl. .............. 161/55, 117/126 GB, 161/58, 161/176
[51] Int. Cl. ........ B32b 5/12, D02g 3/18, D02g 3/24
[58] Field of Search ....................... 57/140 G, 140 C, 57/34 B, 153, 157 F; 117/126 GB; 161/175, 176, 55, 58

[56] References Cited
UNITED STATES PATENTS
3,323,975 6/1967 Marzocchi et al. .................... 57/153
3,448,500 6/1969 Benson ............................... 57/34 B
3,496,714 2/1970 Schroeder .......................... 57/140 G Primary Examiner—William D. Martin
Assistant Examiner—William H. Schmidt
Attorney—Staelin & Overman

[57] ABSTRACT

A composite linear element including an impregnated central body of closely grouped filaments and groups of coated dispersed surface filaments that extend laterally from the outer surface of the impregnated central body. The filaments may be glass. A fabric may be made using the composite linear element.

11 Claims, 10 Drawing Figures

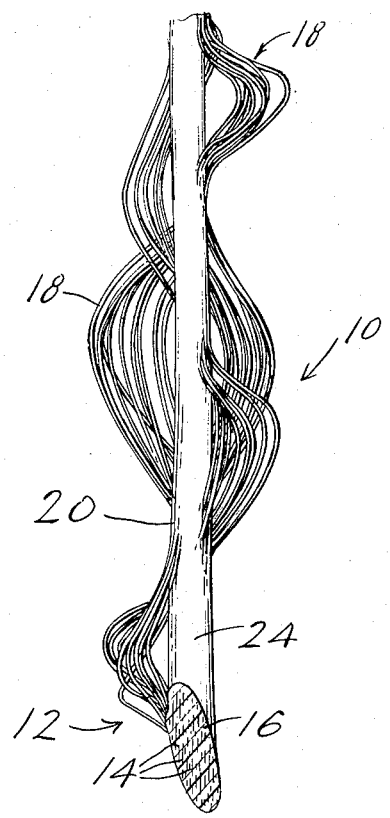
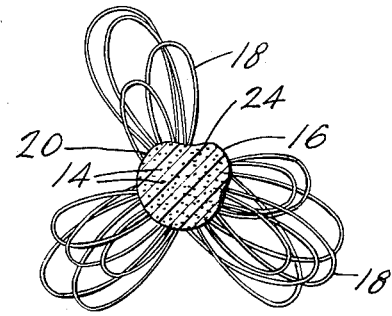
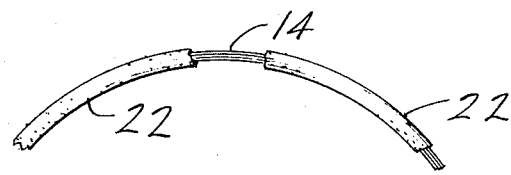
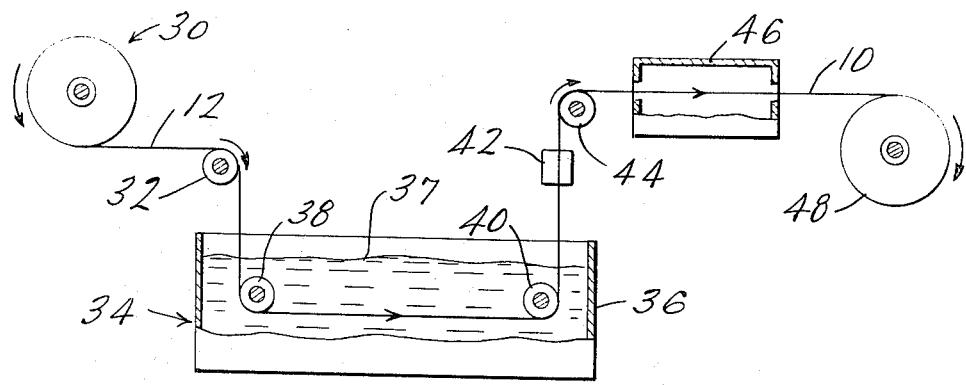

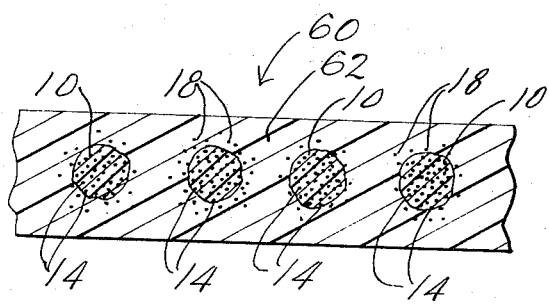
FIG-5-
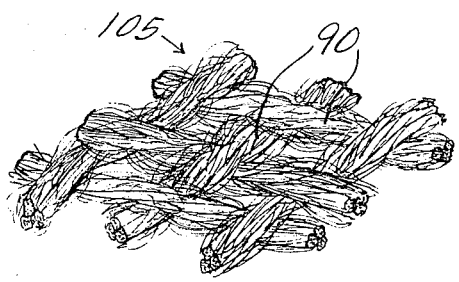
FIG-8-
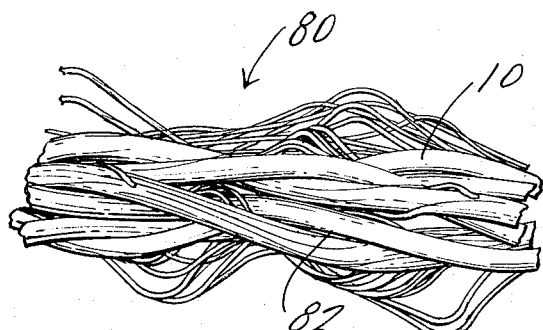
FIG-6-
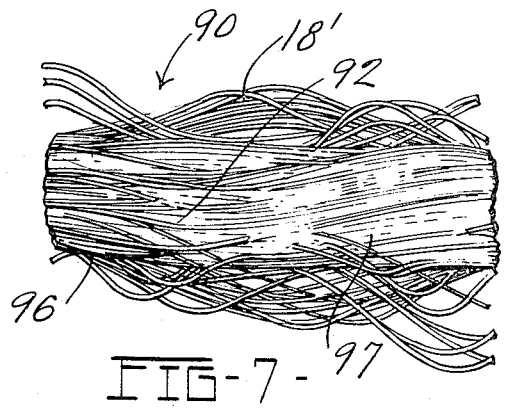
FIG-7-
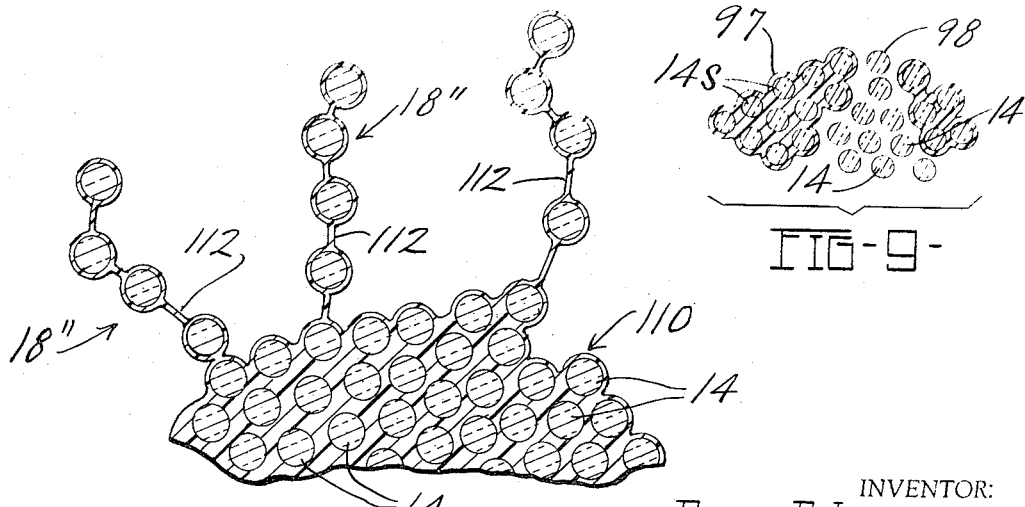
FIG-10-    FIG-9-
INVENTOR:
DAVID E. LEARY
BY
ATT'YS.

COMPOSITE LINEAR ELEMENTS

BACKGROUND OF THE INVENTION

Following the success of glass filaments as a reinforcement for plastic materials, considerable effort began toward developing glass filaments as a reinforcement for elastomeric materials. Glass filament reinforced elastomers offer improved physical properties such as increased dimensional stability, increased resiliency, higher strengths and greater wear. Improved elastomeric articles result through reinforcement with glass filaments; examples are timing belts and pneumatic tires.

Efforts continue to improve elastomeric products reinforced with glass filaments.

Often the glass filaments reinforcing elastomeric products are in the form of glass filament bundles, e.g., glass strands, yarns and cords, and fabrics made from these bundle forms.

The basic bundle for glass filaments is a strand that includes hundreds of glass filaments combined during glass filament forming operations. Normally protective sizing is applied to the filaments in the forming operation before the filaments are brought together into a glass strand.

The glass strand can be processed into glass yarn, plied structures and cords in a conventional manner.

To improve the enhanced properties of elastomeric products reinforced with glass filaments, it has been found desirable in most instances to impregnate the bundle of glass filaments with a composition containing a component of curable elastomeric material. The filaments within the bundle are coated with the composition. Consequently the impregnant is able: to cushion the glass filaments in the bundle to prevent destructive mutual abrasion; to provide resiliency between the glass filaments in the bundle to permit some filament realignment in the direction of stress; to unite the filaments in the bundle and thereby increase coordinated loading that enhances the strength of the reinforced elastomeric product; and to bond to the elastomeric matrix and thereby incorporate the impregnated bundle of glass filaments as an integral part of the elastomeric product. The impregnating composition blends with the elastomeric matrix.

Many compositions are used to coat and impregnate glass filament bundles to produce improved reinforced elastomeric products; however, many of these compositions introduce processing problems. For example, many such compositions form a tacky coating on the bundle of glass filaments. This tacky coating makes processing difficult. Twisting, weaving, braiding, or otherwise arranging the coated glass filament bundles into a desired form becomes most difficult because of high and uneven frictional contact between the coated filament bundles and processing equipment.

Improved adhesion of the bundle of glass filaments to matrix material is always desirable. The need for improved adhesion is especially keen when the elastomeric matrix material tends to form weak chemical bonds with the composition on the bundle of glass filaments.

SUMMARY OF THE INVENTION

An object of the invention is an improved coated textile product.

Another object of the invention is an improved composite linear element for reinforcing elastomeric materials.

Another object of the invention is a more easily processed composite linear element.

These and other objects are attained with a composite linear element including a central body of closely grouped filaments having a coating of flexible material such as an elastomer and including surface portions of dispersed filaments that extend laterally from the outer surface of the coated central body; the dispersed surface filaments of the surface portions have separate coatings on them of the flexible material.

Hence, in a broad sense, the composite linear element is a coated textured textile product, such as a coated glass yarn, that provides surprising advantages, especially in processing and as a reinforcement for an elastomeric matrix.

For example, the coefficient of friction for the composite linear element is lower than untextured multifilament products coated with the same amount of the same coating material in the same state of cure or polymerization.

As a reinforcement for elastomeric products the composite linear element provides improved adhesion to the elastomeric matrix; moreover, elastomeric articles reinforced with the composite linear element of the invention exhibit improved flex life.

Other advantages and objects will become apparent as the invention is more fully described with reference made to the drawings.

DESCRIPTION OF THE DRAWINGS

FIG. 1 is an enlarged lengthwise view of a short portion of a composite linear element according to the principles of the invention.

FIG. 2 is a transverse cross section of the composite linear element of FIG. 1.

FIG. 3 is a showing of a portion of one of the dispersed coated filaments in a surface portion of the composite linear element shown in FIGS. 1 and 2.

FIG. 4 is a simplified view in elevation of apparatus operating to produce a composite linear element according to the principles of the invention.

FIG. 5 is a cross section of a portion of an article of elastomeric material reinforced with the composite linear elements shown in FIGS. 1 and 2.

FIG. 6 shows an enlarged showing of a portion of a plied composite linear element made from the linear elements shown in FIGS. 1 and 2.

FIG. 7 is an enlarged view of a portion of a plied composite linear element according to the principles of the invention.

FIG. 8 is a perspective view of a fabric made using the plied composite linear elements shown in FIG. 7.

FIG. 9 is a greatly enlarged portion of the composite linear element shown in FIG. 7. The Figure shows filaments at a surface region; material impregnates only the outer most filaments in the surface region. The Figure also shows an opening in the impregnating material.

FIG. 10 shows an enlarged portion of a surface region of a composite linear element according to the principles of the invention where the material on the central body forms a thin film between groups of dispersed surface filaments.

DESCRIPTION OF THE PREFERRED EMBODIMENTS

In a broad sense the composite linear element according to the principles of the invention is a bulked or textured yarn, e.g., a glass yarn, impregnated with flexible material, normally an elastomer. Accordingly, the composite linear element includes an impregnated central body of closely grouped filaments and groups of coated dispersed surface filaments that extend laterally away from the outer surface of the impregnated central body. By impregnation it is meant that the flexible material, e.g., elastomeric material, penetrates the bundle of closely grouped filaments of the central body.

FIGS. 1 and 2 represent a composite linear element 10 according to the principles of the invention and as shown includes a textured yarn 12 of continuous glass filaments 14.

The textured glass yarn 12, as illustrated, is the type of yarn disclosed in U.S. Pat. No. 3,411,287. The yarn 12 is an example of a preferred form of textured yarn and is not intended to be limiting; it is possible to use other types of textured yarns. Although the textured yarn 12 is disclosed as a continuous filament glass yarn, it can be continuous or discontinuous filament yarn or strand of any composition, e.g., nylon. Hence the term "yarn" as used in this specification and claims designates a bundle of filaments; the bundle can be twisted or untwisted.

Prior to the texturing or bulking treatment disclosed in U.S. Pat. No. 3,411,287 the filaments of the untextured yarn are generally parallel and form a yarn of substantially uniform diameter along its length.

The textured yarn 12 as shown comprises a central body or core 16 of relatively densely grouped together and substantially parallel filaments. The yarn 12 further comprises surface portions 18 including dispersed filaments in the form of surface undulatory waves that occur randomly along the length of the yarn 12. The surface portions 18 each have generally equal forward and rearward reverse slopes. As more clearly seen in FIG. 2, the filaments of the surface portions 18 extend laterally outwardly from the central body 16 by a substantially equal amount in all directions around the circumference of the yarn 12.

A coating 20 of elastomeric material is around the central body 16. The embodiment of FIGS. 1 and 2 shows the more desirable arrangement where the elastomeric material fully impregnates the central body 16 and forms a continuous coating on the central body 16. Since the elastomeric material fully impregnates the central body 16, it coats the filaments in the bundle 16 while also forming the layer or coating 20 around the bundle or body 16. Hence, the elastomeric material connects filaments 14 to unite them into the central body 16. Because the elastomeric material fully impregnates the central body 16, the elastomeric material within the bundle separates or isolates the glass filaments 14 from each other.

There are times when it is useful to have the elastomeric material only partially impregnate the central body 16. Under such an arrangement the elastomeric material does not permeate throughout the entire bundle and may penetrate only the outermost filaments of the central body 16. With partial penetration the coating 20 can become discontinuous.

The coating 20 is normally thin and can be a micron or less in thickness. The coating 20 can be thicker.

The filaments 14 in the surface portions 18 have separate coatings 22 of the same elastomeric material that is on the central body 16. FIG. 3 illustrates a portion of one of the glass filaments 14 in a surface portion 18 with its individual coating 22. The coating 22 can be a micron or less in thickness; the coating 22 can be thicker.

Each of the surface portions 18 comprises a group of dispersed filaments 14 from the central body 16. Within each surface portion 18 individual filaments vary in length. Hence, the surface portions 18 comprise a number or group of loosely compacted and spaced apart adjacent filaments. Within the surface portions 18 the filaments group themselves from an outermost filament having the greater arch or height above the outer surface 24 of the coating 20 on the central body 16 to filaments inwardly of lesser height above the surface 24. As indicated in FIGS. 1 and 2, the filaments of the surface portions 18 remain individual and separate. However, the elastomeric material forming the coatings 20 and 22 can form a thin film between some of the filaments of the surface portions 18.

Adjacent surface portions 18 are not formed of the same selected filaments. Rather, adjacent surface portions 18 are composed of at least some different groups of filaments coming out of the central body 16. A relatively large number of filaments 14 remain in the central body 16 from wave to wave and each surface portion 18 retains its separate identity from the adjacent portions 18 because filaments return to the central body 16.

As shown in the embodiment of FIG. 1 the majority of the filaments 14 in the surface portion 18 form undulatory waves that have a greater length than arch or height dimension above the coated central body portions 16. Moreover, as shown in FIG. 1, the height of the surface portions 18 from the crest to the surface 24 of the coating 20 on the central body 16 is normally substantially greater than the diameter of the body portion 16 itself. The degree of texturing or bulking given to the textured yarn 12 can alter this relationship.

A composite linear element of the invention is often from 2 to 35 percent by weight of elastomeric material; a lower range of from 5 to 10 percent by weight is also often used.

Since the linear composite element 10 is normally used as a reinforcement for elastomeric articles, the elastomer coatings 20 and 22 are normally not fully cured. Hence, it is usual to have the elastomeric material forming the coatings 20 and 22 in a state of partial cure. At times the elastomeric material of these coatings may be only dried.

Because the elastomeric material coating of the element 10 is normally not fully cured, the material tends to form a tacky coating that has a high coefficient of friction. Yet tests have shown the coefficient of friction for the element 10 is significantly less than an untextured yarn coated with the same elastomeric material in the same state of cure. These tests indicate the coefficient of friction for the element 10 is about one-half the coefficient of friction of untextured yarn coated with the same elastomeric material in the same state of cure.

It is believed that the reduced coefficient of friction for the element 10 results from the dispersed surface The composite linear element 10 is wound onto a package 48.

While the apparatus is shown processing the textured glass yarn 12, it can process other textured yarns and also more complex textile structures such as cords comprising several textured yarns. For example, it is possible to construct a plied structure from the textured glass yarn 12 before or after treatment with the impregnant.

FIG. 5 shows the composite linear elements 10 reinforcing an elastomeric article 60 of an elastomer matrix 62 compatible with the elastomeric material forming the coatings 20 and 22. The individual filaments of the surface portions 18 are dispersed in the elastomeric matrix of the article 60 adjacent to the central body portion 16. It is believed that the filaments of the surface wave portions 18 give improved mechanical engagement of the elements 10 with the elastomeric matrix of the article 60. Tests have shown that adhesion of the elements 10 with elastomeric matrixes is about twice the adhesion of untextured yarn coated with the same amount of the same elastomeric material cured in the same manner.

FIG. 6 shows a plied linear composite structure 80 made using the composite linear elements 10. The structure 80 includes six elements 10; three plied sub-assemblies 82 are used. Each sub-assembly 82 includes two of the linear elements 10 plied together, e.g. 4 turns-per-inch in the Z direction; the sub-assemblies are plied together, e.g., 3.5 turns-per-inch in the S direction. Other plied arrangements can be used.

FIG. 7 shows a plied composite structure or element 90 that includes a three-plied together textured yarn sub-assemblies 92. The sub-assemblies each include two textured yarns 12 (without an elastomer coating) plied together, e.g., 4 turns-per-inch in the Z direction. The three sub-asemblies 92 are plied together, e.g., 3.5 turns-per-inch in the S direction.

Surface portions 18 extend away from the more densely packed together filaments forming a central body portion 96. The closely grouped filaments of the portion 96 comprise the core portions 16 of the textured yarns 12.

An elastomeric coating 97 formed from a composition containing an elastomeric component, e.g., the composition of Example V, is on the central body portion 96. As more clearly seen in FIG. 9 the coating 97 is not continuous; there are openings, such as openings 98, in the coating 97. The openings extend generally along the direction of twist in the plied together sub-assemblied 92. The openings can be larger than the openings 98 shown in FIG. 9; the openings can be as wide as 150 to 450 microns. Their lengths are normally 3 to 4 times as large as their widths. The openings tend to be elliptical in shape and tend to occur more often in the region between the sub-assemblies 92. Further, the coating material only peripherally penetrates or impregnates, e.g., from 10 to 20 microns, the bundle of filaments forming the central body portion 96. The coating 97 on the surface filaments 14S of the bundle 96 is thin, e.g., about 1 micron or less. Hence, only the filaments in a narrow surface region of the portion 96 are coated.

The filaments of the surface portions 18 have coatings 99 along their lengths. The material is the same as the elastomeric material of the coating 97. The coating 99 is about one micron or less thick.

A thin film can bridge between some of the filaments 14 in the surface filament portions 18.

The elastomeric material forming part of the composite plied linear element 90 is from 5 to 8 percent by weight of the element 90.

FIG. 8 shows a woven fabric 105 made using plied composite linear elements 90.

FIG. 10 represents a portion of a transverse section of a composite linear element 110 according to the principles of the invention. The composite linear element 110 includes the textured glass yarn 12 and is similar to the element 10; however, the elastomeric material impregnating the central filament bundle 16 bridges at least some of the filaments 14 in the surface wave portions 18'' as a thin film 112.

The thin elastomeric film 112 substantially locks together or unites the filaments between which the film bridges.

When using the coating composition of Example V, the thin film 112 may begin to form as the elastomeric coating material exceeds 10 percent by weight of the composite element 110.

While the invention has been described with special attention to elastomeric coating materials, there may be times when the textured yarn, e.g. the yarn 12, can be coated with a plastic material, e.g., a vinyl composition, to provide a composite linear element like the elements 10, 80, 90 and 110; however, the coating is plastic material vis-avis elastomeric material. Such a composite element is useful to make decorative fabric, e.g., draperies.

I claim:

1. A composite linear element comprising:
   a linear bundle of filaments, the bundle including a central portion of closely grouped filaments;
   a coating of flexible material on the central portion, the bundle further including dispersed surface filaments along the length of the bundle laterally projecting from the central portion beyond the outer surface of the coating on the central portion between spaced apart locations; and
   a separate coating of the flexible material on individual dispersed surface filaments, the coating on the filaments being sufficiently thin that the coated dispersed surface filaments laterally project from the coated central portion in spaced apart relationship with the outer surface of the coating on the central portion, substantially all of the spaces between the coated filaments and the coated central portion being open, the coating material on the dispersed surface filaments merging with the coating material on the central portion only in the regions where such surface filaments emerge from the central portion.

2. A fabric made using the composite linear element of claim 1.

3. A composite linear element of claim 1 in which the coating on the central portion is discontinuous.

4. A composite linear element comprising:
   a linear bundle of glass filaments, the bundle including a central body of closely grouped glass filaments;
   a coating of elastomeric material impregnating the central body, the bundle further including surface filament portions along the length of the bundle, the surface filament portions comprising groups of dispersed glass filaments laterally extending from portions 18. The filaments in the portions 18 are believed to separate the surface 24 of the coating 20 from a surface over which the element 10 may travel. Hence, in a sense, the filaments of the portions 18 may act as bearing surfaces and reduce contact between an engaging surface and the coating 20. Moreover, it is believed that the surface characteristics of the coating 22 on the filaments 14 in the surface portions 18 may be different from the surface characteristic 24 of the coating 20 although the elastomeric material forming both coatings is the same. It is believed that the thinness of the coating 22 contributes to the reduced coefficient of friction of the linear composite element 10.

Normally the textured yarn 12 has been treated with a liquid sizing composition containing a coupling agent component that enhances the bonding relationship between the glass filament surfaces and the elastomeric matrix reinforced by the element 10. Aminosilanes such as gamma-aminopropyltriethoxysilane represents a suitable coupling agent.

A liquid sizing having a coupling agent may be applied to the glass filaments in the filament forming operation or may be applied to the filaments in the yarn bulking process.

The following represents examples of sizing compositions with a coupling agent:

EXAMPLE I

| | Percent by weight |
|---|---|
| Gamma-aminopropyltriethoxysilane | 0.5–2.0 |
| Glycerine | 0.3–0.6 |
| Water | Remainder |

EXAMPLE II

| | Percent by weight |
|---|---|
| Partially dextrinized starch | 8.0 |
| Hydrogenated vegetable oil | 1.8 |
| Lauryl amine acetate (wetting agent) | 0.4 |
| Non-ionic emulsifying agent | 0.2 |
| Glycylato chromic chloride | 1.0 |

EXAMPLE III

| | Percent by weight |
|---|---|
| Saturated polyester resin | 3.2 |
| Pelargonate amide solubilized with acetic acid | 0.1 |
| Tetraethylene pentamine stearic acid | 0.1 |
| Polyvinyl alcohol | 0.1 |
| Polyvinyl pyrrolidone | 3.0 |
| Gamma-aminopropyltriethoxysilane | 0.3 |
| Acetic acid | 0.1 |
| Water | 93.1 |

The elastomer coatings 20 and 22 are formed by treating the textured yarn 12 with a liquid whose composition includes an elastomeric component. As used herein the term elastomer includes natural rubber or synthetic rubber-like material such as butadiene-styrene copolymer, butadiene-acrylonitrile copolymer, choroprene, isoprene, neoprene-isobutyl rubber, ethylene-alpha-olefin-diolefin terpolymer and the like elastomeric polymers, copolymers, and terpolymers, especially those elastomeric materials that are cured or vulcanized by a peroxide or through sulphur linkages. Mixtures of two or more of these elastomers may be used.

The following represent examples of liquid compositions containing an elastomeric component that may be used to impregnate textured yarn, e.g., the textured yarn 12:

EXAMPLE IV

| | Parts by weight |
|---|---|
| Neoprene rubber | 100 |
| Powdered magnesium oxide | 4 |
| Powdered zinc oxide | 5 |
| Channel black | 15 |
| Thiate B (trialkyl thiourea accelerator) | 1 |

The foregoing ingredients after being mixed on a mill are combined with sufficient of a suitable rubber solvent to form a liquid impregnated bath.

EXAMPLE V

| | Parts by weight |
|---|---|
| Resorcinol formaldehyde resin(75% by weight solids) | 60 |
| Formalin | 20 |
| Sodium hydroxide | 1.5 |
| Butadiene-styrene-vinyl pyridine terpolymer(42% solids) | 900 |
| Ammonium Hydroxide | 95 |
| Vinyl chloride-vinylidene chloride copolymer(50% solids) | 350 |
| Microcrystalline paraffin wax | 200 |
| Water in an amount to reduce the solids content to | 15% |

EXAMPLE VI

| | Parts by weight |
|---|---|
| Lotol 5440, U.S. Rubber Company — Lotol 5440 is a 38 percent dispersed solids system including a butadiene-styrene-vinyl pyridine terpolymer latex, a butadiene styrene latex and a resorcinol-formaldehyde resin | 60 |
| Water | 39 |

EXAMPLE VII

| | Parts by weight |
|---|---|
| Resorcinol formaldehyde resin | 2 |
| Formalin (37% solution) | 1 |
| Concentrated ammonium hydroxide | 2.7 |
| Vinylpyridine terpolymer (42% latex) | 25 |
| Neoprene rubber latex (50% solids) | 41 |
| Butadiene latex (60% solids) | 5 |
| Sodium hydroxide | 0.05 |
| Gamma-aminopropyltriethoxysilane | 1 |
| Vulcanizing agent | 1 |
| Water | 1100 |

FIG. 4 is a somewhat schematic showing of apparatus operating to produce the composite linear element 10. As shown, the textured glass yarn 12 travels from a serving package 30 over a guide shoe 32 to advance downwardly to a coating station 34.

The coating station 34 includes a container 36 holding a liquid impregnant 37, entrance guide 38, exit guide 40 and wiping die 42. The guides 38 and 40 are beneath the surface of the liquid impregnant 37.

The advancing textured glass yarn 12 travels downwardly into the liquid impregnant in the container 36 and turns on the guide 38; the yarn 12 turns on guide 40 to move upwardly and leave the liquid impregnant 37. The yarn 12 passes through the wiping die 42 to remove excess impregnant from the yarn and to assist in effecting coating and impregnating the yarn 12.

One can control the degree of yarn impregnation. For example a person can vary the viscosity of the liquid impregnant (e.g., changing the percentage of solids in the liquid impregnant), change the size of the die 42 and vary the tension in the traveling yarn 12.

From the die 42 the treated yarn 12 advances across turning shoe 44 to move horizontally into a heated zone such as thermal oven 46. The heat of the oven 46 normally does not effect total cure of the elastomer component of the impregnant. Usually the heat from the oven 46 effects only a partial cure to form a partially cured elastomer coating, e.g., the coatings 20 and 22. Often it is desirable only to dry the coating. The elastomeric material can be fully cured.

the central body beyond the outer surface of the coating on the central body between spaced apart locations; and a separate individual coating of the elastomeric material on individual dispersed glass filaments of the surface filament portions, the elastomeric material of the separate individual coatings being merged with the elastomeric material on the central body only in the regions where the dispersed surface filaments emerge from the central body to form a unitary coating on the bundle of glass filaments, the individual coating being sufficiently thin that the coated surface filaments project from the coated central body to be in spaced apart relationship with the outer surface of the coating on the central portion, substantially all of the spaces between the coated filaments and the coated central body being open.

5. A composite linear element for reinforcing elastomeric material comprising:

continuous glass filaments tightly grouped together in a substantially parallel relationship into a central portion;

a coating of elastomeric material impregnating the central portion;

randomly spaced surface portions in which selected groups of dispersed filaments from the central portion extend outwardly from the outer surface of the coating on the central portion in undulatory waves having substantially less filament density than the central portion; and a separate individual coating of the elastomeric material on individual filaments of the selected groups of filaments of the surface portions, the flexible material of the separate individual coatings being merged with the flexible material on the central portion only in the regions where the dispersed surface filaments emerge from the central portion, the individual coatings being sufficiently thin that the coated surface filaments project from the coated central portion to be in spaced apart relationship with the outer surface of the coating on the central portion , substantially all of the spaces between the coated filaments and the coated central portion being open.

6. The composite linear element of claim 5 in which the elastomeric material of the coating on the central portion only partially impregnates the central portion.

7. The composite linear element of claim 5 in which the elastomeric material impregnates from 10 to 15 microns into the central portion.

8. The composite linear element of claim 1 in which the flexible coating material is a plastic.

9. A composite linear element for reinforcing elastomeric material comprising:

continuous glass filaments tightly grouped together in a substantially parallel relationship into a central portion;

a thin coating of elastomeric material on the central portion;

randomly spaced surface portions in which selected groups of filaments from the central portion extend outwardly from the central portion beyond the outer surface of the coated central portion in undulatory waves having substantially less filament density than the central portion; and a separate individual coating of elastomeric material on individual filaments of the surface portions, the elastomeric material of the separate individual coatings being merged with the elastomeric material on the central portion only in the regions where the filaments of the surface portions emerge from the coated central portion and being sufficiently thin that the coated surface filaments project from the coated central portion to be in spaced apart relationship with the outer surface of the coating on the central portion, substantially all of the spaces between the coated filaments of the central portions and the coated central portion being open.

10. The composite linear element of claim 9 in which the elastomeric material is partially cured.

11. A composite linear element for reinforcing elastomeric material comprising:

a linear bundle of glass filaments including a central body of closely grouped glass filaments extending lengthwise of the bundle and dispersed surface filaments extending laterally of the central body;

a coating of elastomeric material on the central body; and a separate individual coating of the elastomeric material on the dispersed surface filament sufficiently thin that at least some of the dispersed surface filaments project in spaced apart relationship beyond the outer surface of the coating on the central body, substantially all of the spaces between the coated filaments and the coated central body being open, the coating material on the dispersed surface filaments merging with the coating material on the central body only in the regions where such surface filaments emerge from the central body.

* * * * *